United States Patent
Kraus et al.

(12) 
(10) Patent No.: US 6,609,823 B2
(45) Date of Patent: Aug. 26, 2003

(54) INFRARED RADIATION THERMOMETER WITH VARIABLE EXTERIOR PROBE HEAD FOR CONFORMING TO BODY CAVITY

(75) Inventors: Bernhard Kraus, Braunfels (DE); Frank Beerwerth, Runkel-Ennerich (DE); Katja Honnefeller, Friedrichsdorf (DE)

(73) Assignee: Braun GmbH, Frankfurt am Main (DE)

( * ) Notice: Subject to any disclaimer, the term of this patent is extended or adjusted under 35 U.S.C. 154(b) by 0 days.

(21) Appl. No.: 09/841,655

(22) Filed: Apr. 24, 2001

(65) Prior Publication Data

US 2001/0046252 A1 Nov. 29, 2001

(30) Foreign Application Priority Data

May 23, 2000 (DE) .......................... 100 25 157

(51) Int. Cl.$^7$ .............................. G01J 5/02; G01J 5/04; G01K 13/02; A61B 5/01; A61B 6/00
(52) U.S. Cl. ................. 374/131; 374/121; 600/474
(58) Field of Search ................ 374/131, 130, 374/121, 158, 209, 208; 600/474, 559

(56) References Cited

U.S. PATENT DOCUMENTS

| | | | | |
|---|---|---|---|---|
| 890,895 A | * | 6/1908 | Fery | ............................ 374/130 |
| 3,500,280 A | | 3/1970 | Ensign | |
| 3,581,570 A | | 6/1971 | Wortz | ........................ 600/549 |
| 3,999,434 A | | 12/1976 | Yen | |
| 4,790,324 A | * | 12/1988 | O'Hara et al. | .............. 374/158 |
| 5,018,872 A | | 5/1991 | Suszynski et al. | .......... 374/133 |
| 5,333,622 A | * | 8/1994 | Casali et al. | ................ 128/864 |
| 5,381,796 A | * | 1/1995 | Pompei | ....................... 374/131 |
| 5,458,121 A | * | 10/1995 | Harada | ........................ 374/130 |
| 5,469,855 A | * | 11/1995 | Pompei et al. | .............. 374/121 |
| 5,653,238 A | * | 8/1997 | Pompei | ....................... 600/474 |
| 5,653,239 A | * | 8/1997 | Pompei et al. | .............. 374/121 |
| 5,833,367 A | * | 11/1998 | Cheslock et al. | ........... 374/158 |
| 5,980,451 A | * | 11/1999 | O'Hara et al. | .............. 374/158 |
| 6,030,117 A | * | 2/2000 | Cheslock et al. | ........... 374/158 |
| 6,042,266 A | | 3/2000 | Cheslock et al. | |
| 6,435,711 B1 | * | 8/2002 | Gerlitz | ........................ 374/130 |

FOREIGN PATENT DOCUMENTS

| | | |
|---|---|---|
| DE | 19604201 | 8/1997 |
| EP | 0472490 | 11/1994 |
| EP | 0674162 | 9/1995 |
| JP | 11316158 | 11/1999 |
| WO | 9513745 | 5/1995 |
| WO | 9623442 | 8/1996 |
| WO | 9821556 | 5/1998 |
| WO | 9919701 | 4/1999 |

OTHER PUBLICATIONS

European Search Report.

* cited by examiner

Primary Examiner—Diego Gutierrez
Assistant Examiner—Stanley J. Pruchnic, Jr.
(74) Attorney, Agent, or Firm—Morgan, Lewis & Bockius LLP

(57) ABSTRACT

The invention is directed to an infrared radiation thermometer, in particular an ear thermometer, having a probe head (10) whose outer diameter and/or shape is variable by an elastic arrangement (4, 14, 24). This enables the probe head to conform itself automatically to the size and/or contour of the body cavity or to be conformed manually. The thermometer is therefore equally well suited for both children and adults, although their ear canals differ in diameter.

20 Claims, 2 Drawing Sheets

INFRARED RADIATION THERMOMETER WITH VARIABLE EXTERIOR PROBE HEAD FOR CONFORMING TO BODY CAVITY

BACKGROUND

This invention relates to an infrared radiation thermometer having a tubular probe head adapted to be introduced into a body cavity, in particular an ear canal, the probe head having at its forward end an opening admitting radiation or an infrared sensor.

From DE 196 04 201 there is known such an infrared radiation thermometer for measuring a person's body temperature. To do this, the probe head can be introduced into a patient's ear. The infrared radiation emitted by the tympanic membrane and the ear canal passes through the probe head, impinging on an infrared sensor. The temperature increase produced by the infrared radiation in the infrared sensor results in an electrical output signal from which the radiation temperature, that is, the patient's actual temperature, can be determined by means of an evaluating unit.

The outside diameter of the probe head is desirably configured to be suitable for persons of all age classes. Considering however that the ear canal diameters of children and adults generally differ widely, there is further known from DE 196 04 201 a protective cover for infrared ear thermometers, which is made of foam plastics, for example, or includes air chambers for enhanced thermal insulation. Such a protective cover conforms itself to the shape and diameter of the ear canal. As a result a probe head provided with such a protective cover is centered in the ear canal of both adults and children, thereby facilitating the desired orientation of the probe head with respect to the tympanic membrane.

The centering effect does not occur, however, with the widely used protective covers of the type known, for example, from EP 0 472 490 B1, which merely comprise a film. This is why the proper alignment of the probe head in the ear canal proves a difficult task, particularly in cases where an ear thermometer equipped with a small probe head suitable for children is to be used for adults. Therefore, for example, the infrared ear thermometer sold under the designation National DM-T2S or DM-T2A comes with two probe heads which differ in diameter and are interchangeable. This ear thermometer is hence adaptable to varying ear canal diameters. Exchanging the probe head is however an awkward procedure and entails the risk of a probe head being lost.

OBJECTS AND SUMMARY OF THE INVENTION

It is an object of the present invention to provide an infrared ear thermometer which is suitable for persons of all age classes because of its ability to be conformed to the ear canals of different persons.

This object is accomplished by an infrared ear thermometer whose probe head is variable in its diameter and/or outer shape by an elastic arrangement. It is of particular advantage when the probe head conforms itself automatically to the size and/or contour of the body cavity or is at least manually conformable thereto.

Arranged in the probe head of a radiation thermometer of the invention in a manner known in the art is an infrared waveguide extending from the tip of the probe head to an infrared sensor and directing the infrared radiation entering through the radiation admitting opening to the infrared sensor. The elastic arrangement surrounds the waveguide coaxially. It is also possible however for the waveguide to be omitted and for the infrared sensor to be disposed directly at the tip of the probe head.

In a preferred embodiment of a thermometer of the present invention, the elastic arrangement comprises a plurality of coaxial telescope elements which are in sliding relationship to each other. The outer shape of the elastic arrangement varies in response to a relative sliding motion of the telescope elements. Each telescope element can be displaced manually by an actuating element connected to the telescope element. Preferably the actuating elements are adapted to snap-lock into place in several discrete positions in which the individual telescope elements occupy predetermined positions, so that each position produces a predetermined outer shape of the probe head with a diameter varying, where provided, in steps along the length of the probe head.

In a first variant of this embodiment the waveguide and the infrared sensor are fixedly connected to the thermometer housing, and the length of the probe head is not variable. The probe head diameter is then at its maximum when the forward ends of all telescope elements are in close proximity to the radiation admitting opening, that is, the telescope elements are fully extended out of the housing, the diameter being at its minimum when the telescope elements are retracted as far as possible into the housing.

In a second variant of this embodiment the waveguide and the infrared sensor are not fixedly connected to the housing of the thermometer but are arranged for joint sliding motion in the housing, that is, the length of the probe head is variable. In this variant the probe head diameter is at a maximum and its length at a minimum when the forward ends of all telescope elements are in close proximity to the radiation admitting opening, that is, the telescope elements and the waveguide are fully retracted into the housing, while the diameter is at a minimum and the length at a maximum when the telescope elements and the waveguide are extended out of the housing to their fullest possible extent. In this variant the waveguide forms the innermost lying telescope element.

In both variants of this embodiment it is particularly advantageous when the elastic arrangement includes additionally an elastic film surrounding the telescope elements and sealing the interstices inevitably occasioned between the telescope elements.

In a second embodiment of a thermometer of the invention the elastic arrangement is a tubular member fabricated from foam plastics or soft foam rubber. The tubular member may be surrounded by an elastic film.

In a third embodiment of a thermometer of the invention the elastic arrangement is comprised of a fluid-filled chamber having its outside wall formed by an elastic film. The outside diameter of the chamber is variable by a slide control, for example. In all embodiments the elastic film is preferably made of a material which can be cleaned easily and is not discomforting to the patient when placed in the ear canal.

A radiation thermometer constructed in accordance with the present invention includes an evaluation device determining the body temperature from the signals supplied by the infrared sensor. With the slide control it is possible to select the parameters needed therefor, so that, for example, for children younger than six years a rectal equivalent temperature, and for children older than six years or adults an oral equivalent temperature can be indicated on an indicating device.

BRIEF DESCRIPTION OF THE DRAWINGS

Embodiments of the infrared radiation thermometer of the invention will be described in more detail in the following with reference to the Figures of the accompanying drawings. In the drawings.

DETAILED DESCRIPTION OF THE INVENTION

Figure 1A:
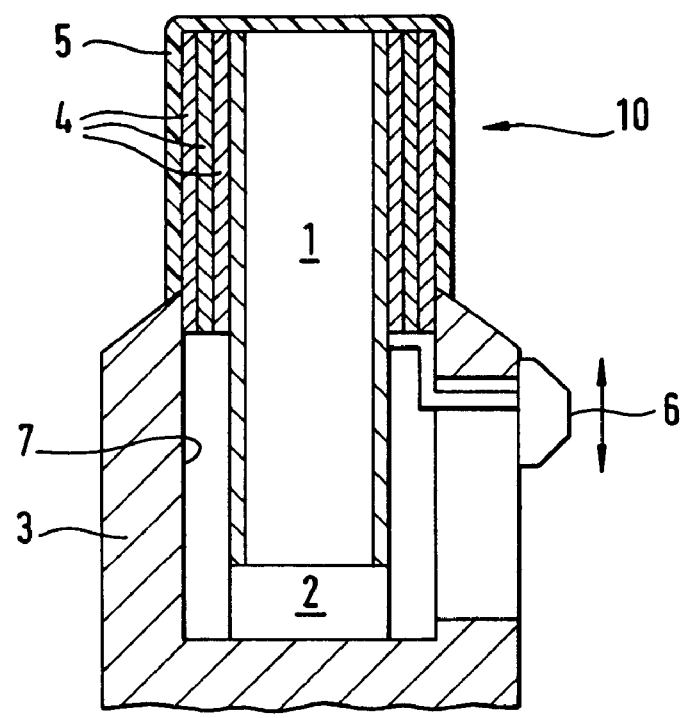
FIG. 1A is a schematic cross sectional view of a first thermometer of the invention, showing the telescope elements in extended position.
Figure 1B:
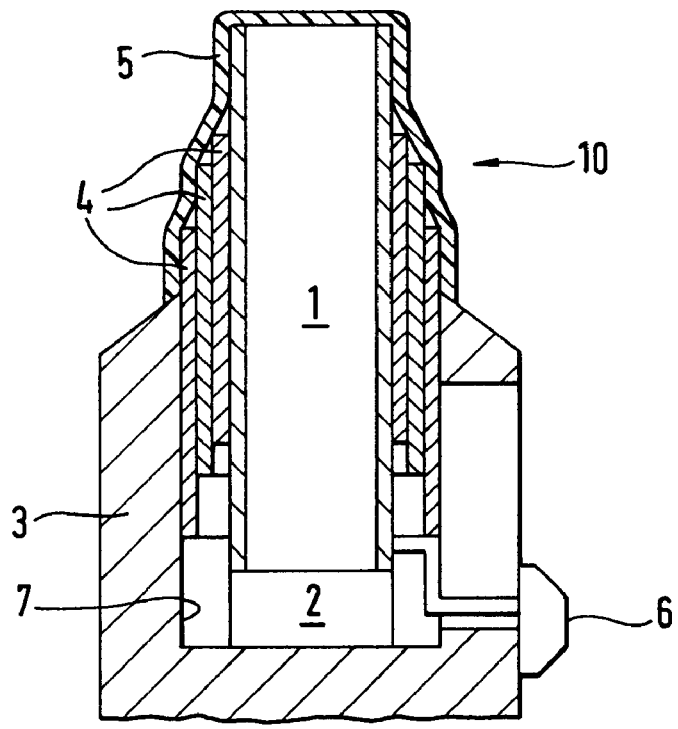
FIG. 1B is a schematic cross sectional view of the invention thermometer of FIG. 1A, but showing the telescope elements in retracted position.

Referring now to FIGS. 1A and 1B, there is shown a probe head of an infrared radiation thermometer of the invention in a schematic cross sectional view. The probe bead 10 projects from a housing 3. It includes a waveguide 1 extending from the tip of the probe head 10 to an infrared sensor 2. The waveguide 1 is surrounded by a plurality of coaxial telescope elements 4 which are slidable relative to each other within a coaxial cavity 7 provided in the housing 3 around the waveguide 1. A slide control 6 mounted on the outside of the housing 3 is connected to the outer lying telescope element which, on displacement, entrains the other telescope elements in a manner known in the art. The slide control is preferably lockable in three positions to select the probe head shapes and probe head diameters suitable for babies, for children up to six years of age, and for older children or adults. The telescope elements are surrounded by an elastic film 5. The film 5 may also be omitted, however. In one variant of this embodiment the slide control 6 is omitted, the cavity 7 accommodating instead a spring similar to the representation of FIG. 3, which spring operates to urge the outermost lying telescope element 4 in the direction of the tip of the probe head 10.

Figure 2:
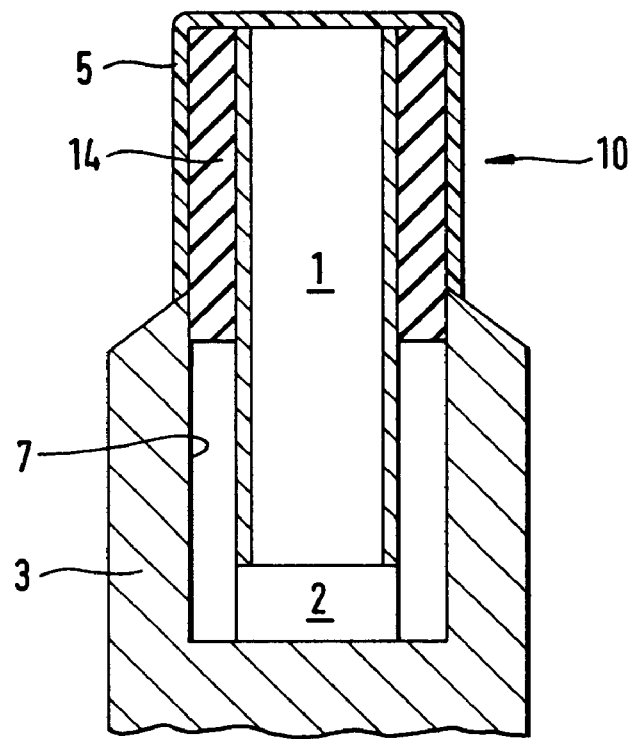
FIG. 2 is a schematic cross sectional view of a second thermometer of the invention.

The probe head of another infrared radiation thermometer of the invention illustrated in FIG. 2 differs from the probe head shown in FIG. 1 only in that a tubular member 14 made of a soft foam plastics material or foam rubber is substituted for the telescope elements and the slide control, which tubular member is readily deformable, conforming itself automatically to the shape and the diameter of the ear canal when the probe head is introduced into the ear canal. The tubular member 14 is surrounded by an elastic film 5. It is also possible for the film 5 to be omitted.

Figure 3:
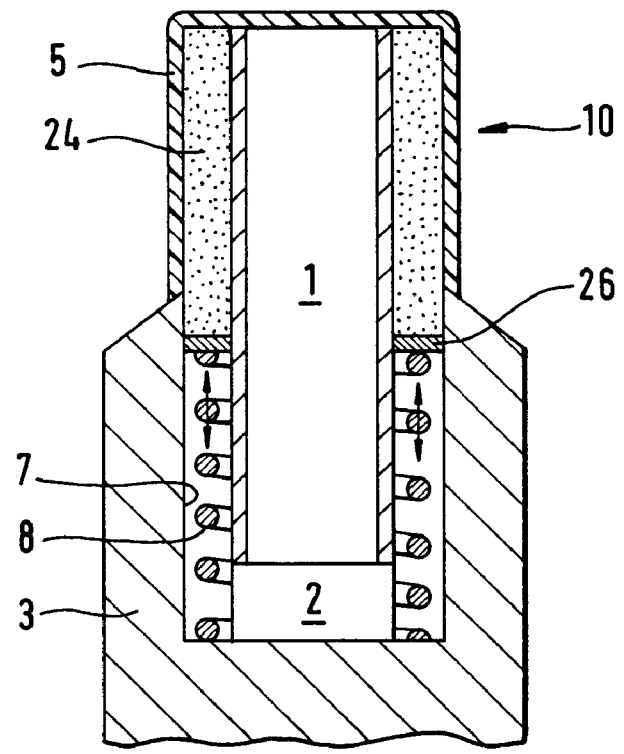
FIG. 3 is a schematic cross sectional view of a third thermometer of the invention.

The probe head, shown in FIG. 3, of a further infrared radiation thermometer of the invention differs from the probe head shown in FIG. 1 only in that a fluid-filled chamber 24 surrounding the waveguide 1 in the manner of a tube is substituted for the telescope elements. The chamber 24 has its outside bounded by the elastic film 5 and its inside by the waveguide 1 and a displaceable slide control 26. Deformability of the probe head 10 is ensured in that the length of the chamber 24 is variable by displacement of the slide control 26. Preferably the slide control is urged by a spring 8 into the position shown in FIG. 3 in which the fluid is forced in the direction of the tip of the probe head, the probe head 10 then reaching its maximum diameter. When the probe head is introduced into an ear canal the diameter of the probe head diminishes automatically as needed, which is accomplished by movement of the slide control 26 in opposition to the pressure of the spring 8 in the direction of the infrared sensor 2, causing the fluid to be distributed along the length of the waveguide 1 with an essentially constant volume of the chamber 24, the elastic film 5 to contract correspondingly, and the cavity 7 to be reduced. Owing to the elasticity of the film 5 and the flowability of the fluid, the probe head 10 is capable of conforming itself to the shape of the auditory canal in any position of the slide control 26. Gas or, for example, a gel-type liquid are equally well suited as fluid.

In one variant of this embodiment the spring 8 is omitted and the slide control 26 is manually adjustable from outside, similar to the representation of FIG. 1.

The elastic film 5 is made of polyethylene, for example, which is transparent to infrared radiation in the wavelength region relevant to the temperature measurement. The film may also be made of a material not transparent to infrared radiation, in which event it has at the forward end of the waveguide 1 an opening to allow passage of the infrared radiation. Preferably then, the waveguide has its forward end closed by an infrared transparent window. The window exists also in variants of probe heads of the invention in which the elastic film 5 is not provided.

What is claimed is:

1. An infrared radiation thermometer comprising:

(a) a probe head adapted to be introduced into a body cavity wherein said probe head comprises an inner tubular member having a proximal portion fixed within a chamber of a housing such that a distal portion of said inner tubular member extends out of said chamber, said probe head further comprising an intermediate tubular member in coaxial relation around said distal portion of said inner tubular member to provide for telescopic sliding of said intermediate tubular member relative to said inner tubular member, said inner and intermediate tubular members each having a cross-sectional area which is generally uniform longitudinally, said probe head having a slide control mounted within said housing in connection with the proximal end of said intermediate tubular member to provide controllable longitudinal displacement of said intermediate tubular member from a position where the distal end of said intermediate tubular member longitudinally coincides with the distal end of said inner tubular member and a position where the distal end of said intermediate tubular member is positioned longitudinally between said housing and the distal end of said inner tubular member; and (b) an infrared sensor connected to said probe head.

2. The infrared radiation thermometer as claimed in claim 1, wherein the intermediate tubular member comprises a plurality of coaxial telescope elements which are in sliding relationship to each other, and the outer shape of said probe head varies in response to the position of the individual telescope elements.

3. The infrared radiation thermometer as claimed in claim 2, wherein said infrared sensor is located within said inner tubular member, said probe head having an opening for admitting radiation into said inner tubular member, said probe head including a waveguide located within said inner tubular member.

4. The infrared radiation thermometer as claimed in claim 3, wherein the probe head further includes an elastic film surrounding the telescope elements.

5. The infrared radiation thermometer as claimed in claim 2, wherein the probe head further includes an elastic film surrounding the telescope elements.

6. The infrared radiation thermometer as claimed in claim 1, wherein the probe head further includes an elastic film surrounding the inner and intermediate tabular members.

7. The infrared radiation thermometer as claimed in claim 1, wherein said infrared sensor is positioned at the forward end of said probe head.

8. The infrared radiation thermometer as claimed in claim 1, wherein said infrared sensor is located within said probe head, said probe head having an opening for admitting radiation therein.

9. An infrared radiation thermometer comprising:
(a) a probe head adapted to be introduced into a body cavity; and (b) an infrared sensor connected to said probe head, wherein the diameter and/or the outer shape of the probe head is variable by a variable arrangement, wherein the variable arrangement is formed by a plurality of coaxial telescope elements which are in sliding relationship to each other, and the outer shape of said variable arrangement varies in response to the position of the individual telescope elements, a spring being provided for urging a telescope element into a predetermined position.

10. An infrared radiation thermometer comprising:
(a) a probe head adapted to be introduced into a body cavity; and (b) an infrared sensor connected to said probe head, wherein the diameter and/or the outer shape of the probe head is variable by a variable arrangement, wherein the variable arrangement is formed by a plurality of coaxial telescope elements which are in sliding relationship to each other, and the outer shape of said variable arrangement varies in response to the position of the individual telescope elements, the telescope elements being displaceable by at least one slide control.

11. The infrared radiation thermometer as claimed in claim 10, wherein the slide control is adapted to snap-lock into a plurality of discrete positions in which the telescope elements occupy predetermined positions.

12. An infrared radiation thermometer comprising:
(a) a probe head adapted to be introduced into a body cavity; and
(b) an infrared sensor connected to said probe head, wherein the diameter and/or the outer shape of the probe head is variable by a variable arrangement, wherein the variable arrangement is formed by a plurality of coaxial telescope elements which are in sliding relationship to each other, and the outer shape of said variable arrangement varies in response to the position of the individual telescope elements, the thermometer including a waveguide forming the innermost lying telescope element, a spring being provided for urging a telescope element into a predetermined position.

13. An infrared radiation thermometer comprising:
(a) a probe head adapted to be introduced into a body cavity; and
(b) an infrared sensor connected to said probe head, wherein the diameter and/or the outer shape of the probe head is variable by a variable arrangement, wherein the variable arrangement is formed by a plurality of coaxial telescope elements which are in sliding relationship to each other, and the outer shape of said variable arrangement varies in response to the position of the individual telescope elements, the thermometer including a waveguide forming the innermost lying telescope element, the telescope elements being displaceable by at least one slide control.

14. An infrared thermometer comprising:
(a) a probe head adapted to be introduced into a body cavity wherein said probe head comprises an inner tubular member positioned in a chamber of a housing such that said inner tubular member is in coaxial relation wit said chamber, said inner tubular member being telescopically displaceable relative to said housing, said inner tubular member having a distal portion around which is an intermediate tubular member in coaxial relation therewith to provide for telescopic sliding of said intermediate tubular member relative to said inner tubular member, said inner and intermediate tubular members each having a cross-sectional area which is generally uniform longitudinally, said probe head having a slide control mounted within said housing in connection with the proximal ends of said inner and intermediate tubular member to provide controllable longitudinal displacement of said inner and intermediate tubular members from positions where (i) the distal end of said intermediate tubular member longitudinally coincides with the distal end of said inner tubular member where both of the distal ends are selectively displaceable longitudinally relative to said housing, and (ii) the distal end of said intermediate tubular member is positioned longitudinally between said housing and the distal end of said inner tubular member where both of the distal ends are selectively displaceable longitudinally relative to said housing; and
(b) an infrared sensor connected to said probe head.

15. The infrared radiation thermometer according to claim 14, wherein the probe head further includes an elastic film surrounding the inner and intermediate tubular members.

16. The infrared radiation thermometer according to claim 14, wherein the intermediate tubular member comprises a plurality of coaxial telescope elements which are in sliding relationship to each other, each of said telescope elements having proximal ends in respective connection with said slide control such that said slide control provides controllable longitudinal displacement of said inner tubular member and telescopic elements from positions where (i) the distal end of said intermediate tubular member longitudinally coincides with the distal ends of each of said telescopic members where all of the distal ends are selectively displaceable longitudinally relative to said housing, and (ii) the distal ends of said telescopic members are positioned longitudinally between said housing and the distal end of said inner tubular member wherein the distal ends of said telescopic elements are progressively closer to the distal end of the inner tubular member as said telescopic elements are radially closer to said inner tubular member where all of the distal ends are selectively displaceable longitudinally relative to said housing.

17. The infrared radiation thermometer according to claim 16, wherein the probe head further includes an elastic film surrounding the telescope elements.

18. The infrared radiation thermometer according to claim 14, wherein said infrared sensor is positioned at the forward end of said probe head.

19. The infrared radiation thermometer as claimed in claim 14, wherein said infrared sensor is located within said inner tubular member, said head having an opening for admitting radiation therein.

20. The infrared radiation thermometer according to claim 19, wherein said inner tubular member includes a waveguide.

* * * * *